United States Patent [19]

Matsuoka et al.

[11] 4,447,112
[45] May 8, 1984

[54] SCANNING OPTICAL SYSTEM HAVING A TILTING CORRECTING FUNCTION

[75] Inventors: Kazuhiko Matsuoka; Kazuo Minoura, both of Yokohama, Japan

[73] Assignee: Canon Kabushiki Kaisha, Tokyo, Japan

[21] Appl. No.: 351,455

[22] Filed: Feb. 23, 1982

[30] Foreign Application Priority Data

Mar. 3, 1981 [JP] Japan .................................. 56-30350

[51] Int. Cl.³ .......................... G02B 27/17; G02B 3/06
[52] U.S. Cl. ........................................ 350/6.5; 350/434
[58] Field of Search ................... 350/6.8, 6.7, 6.6, 6.5, 350/6.1, 6.9, 6.91, 434, 432

[56] References Cited

U.S. PATENT DOCUMENTS

| 3,750,189 | 7/1973 | Fleischer | 350/6.91 |
| 3,870,394 | 3/1975 | Ploeckl | 350/434 |
| 3,890,034 | 6/1975 | Ploeckl | 350/6.8 |
| 3,984,171 | 10/1976 | Hotchkiss | 350/6.7 |
| 3,995,110 | 11/1976 | Starkweather | 350/6.8 |
| 4,281,889 | 8/1981 | Noguchi | 350/6.8 |

OTHER PUBLICATIONS

J. M. Fleischer et al, *IBM Jour. of R. & D.*, vol. 21, No. 5, Sep. 1977, pp. 479–483.

Primary Examiner—Jon W. Henry
Attorney, Agent, or Firm—Fitzpatrick, Cella, Harper & Scinto

[57] ABSTRACT

A scanning optical system having a tilting correcting function includes a light beam generator, a deflector for deflecting the light beam from the light beam generator in a predetermined direction, a first optical system disposed between the light beam generated and the deflector for linearly forming the light beam from the light beam generator near the deflecting and reflecting surface of the deflector, and a second optical system disposed between the deflector and a medium to be scanned for imaging on the medium the light beam deflected by the deflector. The second optical system includes, in succession from the deflector side, a spherical single lens and a single lens having a toric surface. The product of the curvature of the surface of the spherical single lens which is adjacent to the deflector and the curvature of the surface of the spherical single lens which is adjacent to the medium to be scanned is zero or less.

8 Claims, 10 Drawing Figures

SCANNING OPTICAL SYSTEM HAVING A TILTING CORRECTING FUNCTION

BACKGROUND OF THE INVENTION

1. Field of the Invention

This invention relates to a scanning optical system which eliminates the unevenness in pitch of scanning lines.

2. Description of the Prior Art

In light beam scanning devices using a deflecting and reflecting surface on, for example, a rotational polygonal mirror, various scanning optical systems have been proposed in which no unevenness is created in the pitch of scanning lines on a surface to be scanned (a medium to be scanned) even if the direction of travel of the light beam deflected and scanned is varied in a plane perpendicular to the deflection plane by the tilting of the deflecting and reflecting surface. The term "deflection plane" used herein refers to a light beam plane which is formed with lapse of time by a light beam deflected by the deflecting and reflecting surface of the deflector.

For example, in U.S. Pat. No. 3,750,189, the optical system between a deflector and a medium to be scanned comprises beam reforming means and second converging means and a light beam reflected by a deflecting mirror is collimated by the beam reforming means. If the optical system is thus endowed with the collimating function, limitations will be imposed on the configuration of the beam reforming means, and the imaging performance on the surface to be scanned and the degree of freedom which will better the strain characteristic for making the scanning speed constant will be decreased. Thus unless the number of lenses forming the second converging means is increased, good performance cannot be obtained.

Next, in U.S. Pat. No. 3,865,465, a predetermined limitation is imposed on the ratio of the focal lengths of two lenses forming the optical system between the deflector and the medium to be scanned and satisfying this limitation is equivalent to collimating the light beam in a cross section perpendicular to the deflection plane between said two lenses. Accordingly, again in this example, the imaging performance and the degree of freedom which corrects the strain characteristic are decreased and this is not desirable.

In U.S. Pat. No. 3,946,150, a cylindrical lens is disposed between a lens having a strain characteristic for realizing uniform speed scanning and the medium to be scanned. In the case of such construction, a good image cannot be obtained unless the position of the cylindrical lens is brought close to the medium to be scanned. If the cylindrical lens is brought close to the medium to be scanned, the cylindrical lens will become longer in the direction of the bus line as the scanning width becomes greater, and this will prevent the construction from being made compact.

SUMMARY OF THE INVENTION

It is an object of the present invention to overcome the above-noted disadvantages peculiar to prior art scanning devices and to provide a scanning optical system which is of a simple and compact construction and capable of correcting for tilting of the deflector.

It is a further object of the present invention to provide a scanning optical system the beam scanning speed of which is constant on a surface to be scanned.

In the scanning optical system according to the present invention, the above objects are achieved by disposing the imaging optical system for scanning between the deflector and the medium to be scanned with the imaging optical system including a single spherical lens and a single lens having a toric surface, in succession from the deflector side. That is, the scanning optical system according to the present invention is provided with a light source device, a first imaging optical system for linearly imaging the light beam from the light source device, a deflector having its deflecting and reflecting surface near the linear image, and a second imaging optical system for forming the linear image as a spot on a medium to be scanned, the second imaging optical system comprising, in succession from the deflector side, a single spherical lens in which the product of the curvature of its surface adjacent to the deflector and the curvature of its surface adjacent to or on the side of the medium to be scanned is zero or less and which has a negative refractive power, and a toric single lens. In this specification, "curvature" is intended to mean the reciprocal of the radius of curvature of a lens surface. Further, a case where the position of the center of curvature of the surface lies toward the deflector from the surface is defined as negative curvature and a case where the position of the center of curvature of the surface lies toward the medium to be scanned from the surface is defined as positive curvature. In other words, the spherical single lens takes a double concave shape or a plano-concave shape. The term "toric lens" used herein means a lens which has powers in orthogonal directions in a plane orthogonal to the optical axis of the lens and in which the powers differ from each other in the orthogonal directions.

In the scanning optical system according to the present invention, the toric lens is a positive meniscus lens which, in a cross section containing the optical axis of the spherical single lens and perpendicular to the deflection plane formed by the beam deflected by the deflector, comprises a surface having a negative refractive power on the deflector side and a surface having a positive refractive power on the side of the medium to be scanned.

In the scanning optical system according to the present invention, the imaging optical system for scanning disposed between the deflector and the medium to be scanned does not have beam reforming means for temporally collimating the light beam deflected by the deflector. That is, it does not use means having a collimating function and therefore, no limitation is imposed on the imaging performance of the imaging optical system and the degree of freedom with which the strain characteristic is well corrected. This results in realization of a simple and compact construction.

Further, in the present invention, the toric lens is provided on that side of the spherical single lens which is adjacent to or faces the medium to be scanned, and this, as compared with the case of a cylindrical lens, enables correction of the strain characteristic and compactness of the device. That is, where a cylindrical lens is used, the refractive power thereof in the deflection plane is zero and there is no degree of freedom with which curvature of the image field is corrected. In contrast, a toric lens has a refractive power in the deflection plane and can therefore correct curvature of the image field. Also, if an attempt is made to make the imaging optical system for scanning compact by using a cylindrical lens, a great deal of curvature of image field will be created and it cannot be corrected by the cylindrical lens itself for the reason set forth above. In contrast, a toric lens has a degree of freedom of correction and accordingly can make the device compact.

The invention will become more fully apparent from the following detailed description thereof taken in conjunction with the accompanying drawings.

DESCRIPTION OF THE PREFERRED EMBODIMENTS

Figure 1:
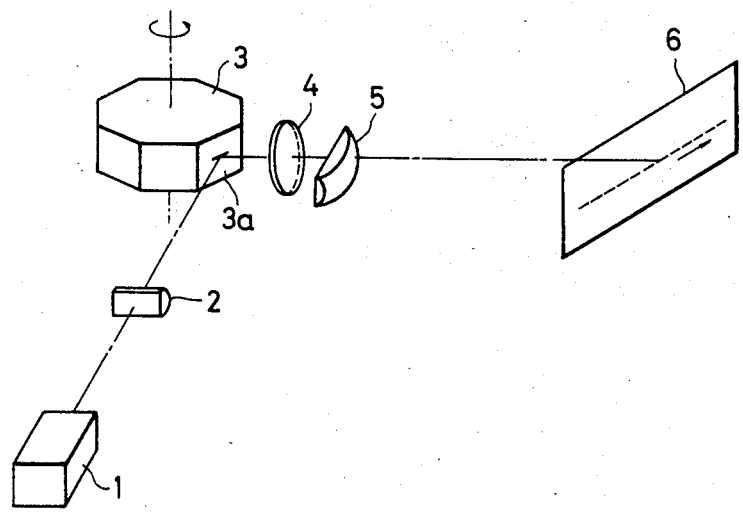
FIG. 1 illustrates the principle of the scanning optical system according to the present invention.

FIG. 1 illustrates the construction according to the principle of the present invention. There are disposed a light source device 1 comprising either a light source alone or a light source and a condensing device, a linear image forming system 2 for linearly imaging a light beam emitted from the light source device 1, a deflector 3 having a deflecting and reflecting surface 3a near a position where the light beam is linearly converged by the linear image forming system 2, a single spherical lens 4 between the deflector 3 and a medium 6 to be scanned, and a single lens 5 having different refractive powers in two orthogonal directions and having a toric surface having a main axis and an auxiliary axis. An imaged spot is formed on the medium 6 to be scanned by a composite system comprising those lenses and, as the deflector 3 is rotated, the imaged spot scans the medium 6.

Figure 2:
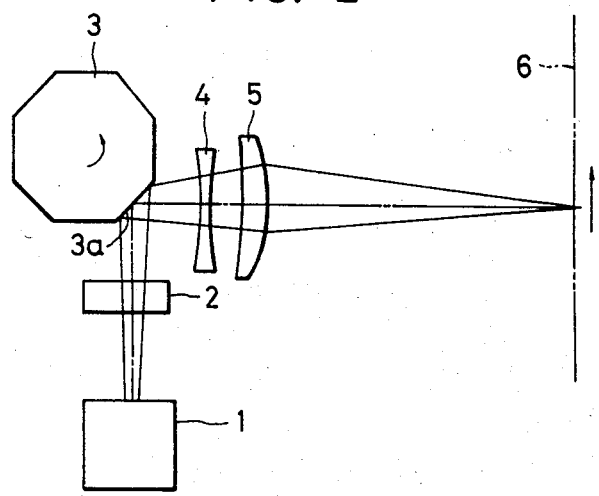
FIG. 2 is a cross-sectional view for illustrating the function of the present invention in a plane parallel to the deflection plane.

FIG. 2 is a view for illustrating the function in a cross section parallel to the deflection plane of the above-described construction, or in other words, to a plane containing the main axis of the toric lens 5 and the optical axis of the spherical single lens 4. The light beam emitted from the light source device 1 passes through the cylindrical lens 2, whereafter it is reflected by the reflecting surface 3a of the deflector 3 and the reflected light beam is deflected as the deflector 3 is rotated. Further, the deflected light beam is imaged on the medium 6 to be scanned by the composite system comprising the spherical single lens 4 and the lens 5 having the toric surface and the scanning speed of the imaged spot is kept constant.

Figure 3:
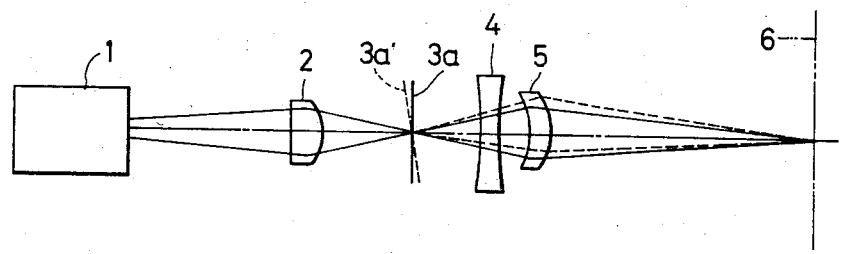
FIG. 3 is a view for illustrating the function of the present invention in a cross section perpendicular to the deflection plane.

FIG. 3 is a developed view of a cross section along the light beam in a direction perpendicular to said deflection plane, namely, a cross section for correcting the influence of tilting of the deflector. The light beam emitted from the light source device 1 is linearly imaged near the reflecting surface 3a of the deflector 3 by the linear image forming system 2. The refractive power of the single lens 5 in this cross section, unlike the refractive power of the lens 5 in said deflection plane, makes the positional relation between the reflecting surface 3a of the deflector 3 and the medium 6 to be scanned optically conjugate by the composite system comprising the spherical single lens 4 and the single lens 5. Because of such a relation, even if the reflecting surface 3a is inclined in a direction perpendicular to the deflection plane to assume a position 3a' during rotation of the deflector 3, the light beam passed through the lens system 4, 5 varies as indicated by broken line but the imaged position on the medium 6 to be scanned does not vary.

Description will now be made of why good imaging performance and uniform speed scanning on the medium to be scanned are achieved in the scanning optical system of the present invention even though it is of a simple and compact construction. Where the aperture ratio is as small as 1:30–1:100, the lens construction for obtaining a good scanning property need only comprise two single lenses.

Generally, in a lens system having a small aperture ratio, the aberration coefficients to be corrected are the astigmatism coefficient (III), the sagittal curvature of image field coefficient (IV) and the distortion coefficient (V). The above-mentioned aberration coefficients of the entire lens system have the following relations between characteristic coefficients $a_{IIIi}$, $b_{IIIi}$, $c_{IIIi}$, $a_{IVi}$, $b_{IVi}$, $c_{IVi}$, $a_{Vi}$, $b_{Vi}$, $c_{Vi}$ and intrinsic coefficients $A_{0i}$, $B_{0i}$.

$$III = \sum_{i=1}^{N} (a_{IIIi} A_{0i} + b_{IIIi} B_{0i} + c_{IIIi}) \tag{1}$$

$$IV = \sum_{i=1}^{N} (a_{IVi} A_{0i} + b_{IVi} B_{0i} + c_{IVi})$$

$$V = \sum_{i=1}^{N} (a_{Vi} A_{0i} + b_{Vi} B_{0i} + c_{Vi})$$

The characteristic coefficients are constants determined by the paraxial relation and medium, and the intrinsic coefficients $A_{0i}$ and $B_{0i}$ are coefficients which determine the shape of the ith construction group. Formula (1) above represents the general relation in a case where the number of construction groups is N. (Matsui, *Lens Designing Method*, Kyoritsu Publishing Co., Ltd.).

Further, where each construction group is a single lens, there is the following subordinate relation between the intrinsic coefficients $A_{0i}$ and $B_{0i}$ of each single lens.

$$A_{0i} = \alpha_i B_{0i}^2 + \beta_i B_{0i} + \gamma_i \tag{2}$$

where $\alpha_i$, $\beta_i$ and $\gamma_i$ are constants determined by the refractive index of the medium of the ith single lens.

The scanning optical system according to the present invention is an anamorphic optical system in which the focal length $f_p$ in the deflection plane and the focal length $f_v$ in a cross section perpendicular to the deflection plane differ from each other and if attention is paid to the focal length in the deflection plane, meridional curvature of image field ΔM and distortion must be the objects of correction. ΔM has the following relation between the astigmatism coefficient (III) and the sagittal curvature of image field coefficient (IV):

$$\Delta M = -\frac{g\hat{k}'^2}{2N_k'}(2\,III + IV)(N_1 \tan \theta)^2 \quad (3)$$

where $N_1$ and $N_k'$ represent the refractive indices on the object side and the image side, respectively, $\theta$ represents the half angle of view of the incident light, and $g\hat{k}'$ represents the distance to the Gauss image plane measured from the rearward principal plane of the optical system.

If formula (2) is substituted into formula (1) and rearranged with formula (3) taken into consideration, there is obtained:

$$\begin{cases} 2\,III + IV = \sum_{i=1}^{N} [\xi(2\,III + IV)i\,\beta_0^2 + \\ \quad \eta(2\,III + IV)i\,\beta_{0i} + \zeta(2\,III + IV)i] \\ V = \sum_{i=1}^{N}(\xi_{Vi}\,\beta_0^2 + \eta_{Vi}\,\beta_{0i} + \zeta_{Vi}) \end{cases} \quad (4)$$

where $\xi(2\,III+IV)i$, $\eta(2\,III+IV)i$, $\zeta(2\,III+IV)i$, $\xi V_i$, $\eta V_i$ and $\zeta V_i$ are constants determined by the aforementioned characteristic coefficients and the aforementioned constants $\alpha_i$, $\beta_i$ and $\gamma_i$.

If, in formula (4), desired aberration coefficient values for obtaining a strain characteristic for obtaining good imaging performance and uniform speed scanning are set and the number of constitutional lenses is two (N=2), then it is possible to solve simultaneous equations having $\beta_{01}$ and $\beta_{02}$ as unknown numbers and thus, $\beta_{01}$ and $\beta_{02}$ can be obtained.

$\beta_{0i}$ is expressed as follows by the radius of curvature $R_i$ of the forward surface of the ith lens and the refractive index $N_i$ of the medium of that lens (Matsui, *Lens Designing Method*).

$$\beta_{0i} = -\frac{N_i}{N_i - 1} + \frac{N_i + 1}{N_i}\left(\frac{1}{R_i}\right)$$

Hence, $$R_i = \left(\frac{N_i + 1}{N_i}\right) \Big/ \left(\beta_{0i} + \frac{N_i}{N_i - 1}\right) \quad (5)$$

It is thus possible to obtain the radii of curvature $R_1$ and $R_2$ of the forward surfaces of the respective lenses by using formula (5) and by the intrinsic coefficients $\beta_{01}$ and $\beta_{02}$ of the two groups obtained from the aforementioned result, and the radii of curvature $R_1'$ and $R_2'$ of the rearward surfaces of the respective lenses can also be obtained from the following formula.

$$R'_i = (1 - N_i) \Big/ \left(1 - \frac{N_i - 1}{R_i}\right) \quad (6)$$

In the foregoing, the constitutional lenses are handled as thin lenses the focal lengths of which have been regularized into 1.

In the actual system of FIG. 2, assuming that the refractive powers of the lenses 4 and 5 are $\phi_1$ and $\phi_2$, respectively, the radii of curvature $r_1$, $r_2$, $r_3$ and $r_4$ of the forward and rearward surfaces of the respective lenses are as follows:

$r_1 = R_1/\phi_1$ $r_2 = R_1'/\phi_1$ $r_3 = R_2/\phi_2$ $r_4 = R_2'/\phi_2$

As described above, to obtain good imaging performance by a construction comprising two single lenses, it is possible to determine the shape of each lens in which 2 III+IV comprising the astigmatism coefficient (III) and the sagittal curvature of image field coefficient (IV) and the distortion coefficient (V) corresponding to the strain characteristic for achieving uniform speed scanning are set to respective desired values.

On the other hand, the allowance $\Delta x$ of the depth of focus of the optical system is given by $\Delta x = K \cdot$(effective F No.)$^2 \cdot \lambda$, where K is a constant determined by the cross-sectional intensity distribution of the beam, the condition of the truncation of the beam, etc. The effective F No. is determined by a light ray providing the intensity of $1/e^2$ of the central intensity of the imaged spot. $\lambda$ is the wavelength used. Accordingly, the value of 2 III+IV for which the aforementioned meridional curvature of image field $\Delta M$ satisfies $|\Delta M| \leq \Delta x$ may be the target of design.

In the scanning optical system according to the present invention, desired values of 2 III+IV and V have been obtained in a case where the aforementioned spherical single lens is a spherical single lens in which the product of the curvature of its surface adjacent to the deflector and the curvature of its surface adjacent to, that is on the side of, the medium to be scanned is zero or less and which has a negative refractive power.

Next, a toric surface is introduced with respect to the direction perpendicular to the deflection plane and therefore, it is possible to provide a focal length different from the focal length of the composite system comprising the lenses 4 and 5 in the deflection plane. Accordingly, it is possible to provide an imaging relation different from the imaging relation in the deflection plane, and the reflecting surface 3a of the deflector and the position of the medium 6 to be scanned are brought into a conjugate relation.

What is more important in the present invention is that in a cross section containing the optical axis and perpendicular to the deflection plane, at least one surface of the single lens 5 having a toric surface has a negative refractive power. This is convenient for the correction of the curvature of image field for causing the light beam deflected in the cross section perpendicular to the deflection plane to form a good imaged spot on the medium 6 to be scanned.

Further, if, in a cross section parallel to the deflection plane, the value of the curvature $1/r_3$ of the deflector side surface of the single lens 5 having a toric surface is in the vicinity of zero, the correction effect of the above-mentioned curvature of image field will be great.

This condition means that the diverging power for the incident light beam in the cross section perpendicular to the deflection plane becomes stronger as the deflection angle becomes greater, and creates the effect of correcting the image plane in the positive direction.

Further, if the ratio $f_T/f_T'$ of the focal length $f_T$ of the single lens 5 having a toric surface in the cross section parallel to the deflection plane and the focal length $f_T'$ of the single lens 5 in the cross section perpendicular to the deflection plane is of a value less than or equal to 5.0, it will also become possible to correct well the strain characteristic in the deflection plane.

Another important point is that, in the cross section containing the optical axis and perpendicular to the deflection plane, the shape of the single lens 5 having the toric surface should desirably be that of a meniscus single lens having a surface of positive refractive power disposed on the side of the medium 6 to be scanned and having a positive refractive power as a whole. This has the effect of bringing, in the cross section perpendicular to the deflection plane, the principal point position of the composite system comprising the spherical single lens 4 and the single lens 5 having the toric surface close to the medium to be scanned. As a result, it becomes possible to bring the entire lens system close to the deflector and thus, the optical system becomes compact. Assuming that the focal lengths of the above-mentioned composite system in the cross section parallel to the deflection plane and in the cross section perpendicular to the deflection plane are $f_p$ and $f_v$, the aforementioned effect will be great if $4.0 < (f_p/f_v) < 5.4$ is satisfied.

Next, the desired value of the distortion coefficient (V) which is to be corrected is determined by the rotational characteristic of the deflector 3.

When the deflector 3 is rotated at a uniform angular speed, the value of the distortion coefficient for which the light beam deflected by the deflector is moved at a uniform speed on the surface of the medium 6 to be scanned is $V = \frac{2}{3}$.

Where the deflector 3 is in sine vibration as represented by $\phi = \phi_0 \sin \omega t$ ($\phi$ is the angle of rotation, $\phi_0$ is the amplitude, $\omega$ is a constant regarding the period, and t is time), the value of the distortion coefficient for which the light beam deflected by the deflector 3 is moved at a uniform speed on the surface of the medium 6 to be scanned is $$V = \frac{2}{3}\left(1 - \frac{1}{8\phi_0^2}\right).$$

The present invention does not collimate the light beam between said spherical single lens 4 and the single lens 5 having the toric surface and therefore, the degree of freedom of the refractive power of each of said lenses is not limited, and good imaging performance and strain characteristic can be achieved by the two lenses.

Embodiments of the second imaging optical system of the scanning optical system according to the present invention will be shown below.

The second imaging optical system comprises, in succession from the deflector side, a spherical single lens 4 and a single lens 5 having a toric surface, the spherical single lens 4 being one in which the product of the curvature of its surface adjacent to the deflector and the curvature of its surface adjacent to the medium to be scanned is zero or less and which has a negative refractive power.

Tables 1 to 8 below show embodiments of the imaging optical system (4, 5) according to the present invention.

Of these tables, those ones given a suffix (a) show lens data. $r_1$–$r_4$ represent the radii of curvature of the lenses in the plane parallel to the deflection plane, $r_1'$–$r_4'$ represent the radii of curvature of the lenses in the cross section perpendicular to the deflection plane (accordingly, with regard to the spherical single lens 4, $r_1 = r_1'$ and $r_2 = r_2'$), $d_1$ represents the on-axis thickness of the spherical single lens 4, $d_2$ represents the on-axis air space between the $r_2$ surface of the spherical single lens 4 and the $r_3$ surface of the single lens 5 having the toric surface (which air space is equal to the on-axis air space between the $r_2'$ surface of the spherical single lens 4 and the single lens 5 having the toric surface), $d_3$ represents the on-axis thickness of the single lens 5 having the toric surface, $n_1$ represents the refractive index of the spherical single lens 4, and $n_2$ represents the refractive index of the single lens 5 having the toric surface.

Description will now be made of those of the tables which are given a suffix (b). In a plane parallel to the deflection plane (hereinafter referred to as the flat deflection plane) and in a cross section perpendicular to the deflection plane (hereinafter referred to as the perpendicular cross section), the focal length of the composite system comprising the spherical single lens 4 and the single lens 5 having the toric surface is shown in column f. Particularly, for convenience of description, the focal length in said "flat deflection plane" is mentioned as $f_p$ and the focal length in said "perpendicular cross section" is mentioned as $f_v$. The focal length of the single lens 5 having the toric surface is shown in column $f_5$.

For convenience of description, the focal length in the "flat deflection plane" is mentioned as $f_T$ and the focal length in the "perpendicular cross section" is mentioned as $f_T'$. The back focal length is shown in column b.f. The object distance from the first surface (namely, the $r_1$ or $r_1'$ surface of the spherical single lens) is shown in column $S_1$. Column $Sk'$ shows the distance from the last surface (the $r_4$ or $r_4'$ surface) of the single lens 5 having the toric surface to the Gauss image plane when the object distance is $S_1$. Column Effective F No. shows the image side effective F-number when the object distance is $S_1$.

Those of the tables which are given a suffix (c) show the third order aberration coefficient as regularized into $f_p = 1$ in the plane parallel to the deflection plane.

Description will now be made of those of the tables which are given a suffix (d). Column δ shows the angle (unit: rad.) which, when regularized into $f_v = 1$, a paraxial ray incident on the $r_1'$ surface of the spherical single lens 4 at a height 1 on the principal plane in the cross section perpendicular to the deflection plane forms with the optical axis when it is incident on the $r_3'$ surface of the single lens 5 having the toric surface after it has emerged from the $r_2'$ surface of the spherical single lens 4. If $\delta \neq 0$, it means that the light beam is not collimated between the $r_2'$ surface of the spherical single lens 4 and the $r_3'$ surface of the lens 5 having the toric surface.

TABLE 1-(a)

| $r_1$ | −320.000 | $r_1'$ | −320.000 | $d_1$ | 6.00 | $n_1$ | 1.77944 |
|---|---|---|---|---|---|---|---|
| $r_2$ | 346.511 | $r_2'$ | 346.511 | $d_2$ | 12.59 | | |
| $r_3$ | ∞ | $r_3'$ | −37.736 | $d_3$ | 5.61 | $n_2$ | 1.70415 |
| $r_4$ | −51.861 | $r_4'$ | −11.037 | | | | |

TABLE 1-(b)

| | | f | | $f_5$ | b.f. | $S_1$ | $Sk'$ | Effective F No. |
|---|---|---|---|---|---|---|---|---|
| Flat | $f_p$ | 100.0 | $f_T$ | 73.65 | 108.29 | −∞ | 108.29 | 60.0 |

TABLE 1-(b)-continued

|  |  | f | $f_5$ | b.f. | $S_1$ | Sk' | Effective F No. |
|---|---|---|---|---|---|---|---|
| deflection plane |  |  |  |  |  |  |  |
| Perpendicular cross section | $f_v$ | 20.56 | $f_{T'}$ 20.38 | 23.61 | −5.09 | 109.46 | 100.0 |

TABLE 1-(c)

| I | II | III | IV | V | 2III + IV |
|---|---|---|---|---|---|
| 11.835 | −0.966 | −0.109 | 0.424 | 0.856 | 0.206 |

TABLE 1-(d)

| δ | ε max | $r_4/r_3$ | $f_p/r_3$ | $f_T/f_{T'}$ | $f_p/f_v$ |
|---|---|---|---|---|---|
| −0.83 | 35.80 | 0.0 | 0.0 | 3.6 | 4.9 |

TABLE 2-(a)

| $r_1$ | ∞ | $r_1'$ | ∞ | $d_1$ | 1.20 | $n_1$ | 1.64401 |
|---|---|---|---|---|---|---|---|
| $r_2$ | 103.914 | $r_2'$ | 103.914 | $d_2$ | 117.94 |  |  |
| $r_3$ | ∞ | $r_3'$ | −58.878 | $d_3$ | 5.46 | $n_2$ | 1.48164 |
| $r_4$ | −33.719 | $r_4'$ | −9.638 |  |  |  |  |

TABLE 2-(b)

|  |  | f | $f_5$ | b.f. | $S_1$ | Sk' | Effective F No. |
|---|---|---|---|---|---|---|---|
| Flat deflection plane | $f_p$ | 100.0 | $f_T$ 70.01 | 113.39 | −∞ | 113.39 | 60.0 |
| Perpendicular cross section | $f_v$ | 23.23 | $f_{T'}$ 23.10 | 27.12 | −6.29 | 115.36 | 100.0 |

TABLE 2-(c)

| I | II | III | IV | V | 2III + IV |
|---|---|---|---|---|---|
| 26.273 | 0.781 | −0.261 | 0.326 | 0.578 | −0.196 |

TABLE 2-(d)

| δ | ε max | $r_4/r_3$ | $r_p/r_3$ | $f_T/f_{T'}$ | $f_p/f_v$ |
|---|---|---|---|---|---|
| −0.83 | 36.57 | 0.0 | 0.0 | 3.0 | 4.3 |

TABLE 3-(a)

| $r_1$ | ∞ | $r_1'$ | ∞ | $d_1$ | 1.28 | $n_1$ | 1.77944 |
|---|---|---|---|---|---|---|---|
| $r_2$ | 201.193 | $r_2'$ | 201.193 | $d_2$ | 16.24 |  |  |
| $r_3$ | ∞ | $r_3'$ | −46.717 | $d_3$ | 5.65 | $n_2$ | 1.59 |
| $r_4$ | −45.786 | $r_4'$ | −10.620 |  |  |  |  |

TABLE 3-(b)

|  |  | f | $f_5$ | b.f. | $S_1$ | Sk' | Effective F No. |
|---|---|---|---|---|---|---|---|
| Flat deflection plane | $f_p$ | 100.0 | $f_T$ 77.60 | 107.67 | −∞ | 107.67 | 60.0 |
| Perpendicular cross section | $f_v$ | 22.14 | $f_{T'}$ 22.02 | 24.89 | −6.55 | 108.96 | 100.0 |

TABLE 3-(c)

| I | II | III | IV | V | 2III + IV |
|---|---|---|---|---|---|
| 13.682 | −0.553 | −0.170 | 0.423 | 0.576 | 0.083 |

TABLE 3-(d)

| δ | ε max | $r_4/r_3$ | $f_p/r_3$ | $f_T/f_{T'}$ | $f_p/f_v$ |
|---|---|---|---|---|---|
| −0.81 | 35.59 | 0.0 | 0.0 | 3.5 | 4.5 |

TABLE 4-(a)

| $r_1$ | ∞ | $r_1'$ | ∞ | $d_1$ | 3.01 | $n_1$ | 1.62 |
|---|---|---|---|---|---|---|---|
| $r_2$ | 172.421 | $r_2'$ | 172.421 | $d_2$ | 15.08 |  |  |
| $r_3$ | ∞ | $r_3'$ | −36.647 | $d_3$ | 5.57 | $n_2$ | 1.72099 |
| $r_4$ | −56.240 | $r_4'$ | −11.475 |  |  |  |  |

TABLE 4-(b)

|  |  | f | $f_5$ | b.f. | $S_1$ | Sk' | Effective F No. |
|---|---|---|---|---|---|---|---|
| Flat deflection plane | $f_p$ | 100.0 | $f_T$ 78.40 | 106.59 | −∞ | 106.59 | 60.0 |
| Perpendicular cross section | $f_v$ | 21.34 | $f_{T'}$ 21.21 | 24.18 | −5.44 | 107.43 | 100.0 |

TABLE 4-(c)

| I | II | III | IV | V | 2III + IV |
|---|---|---|---|---|---|
| 9.669 | −1.068 | −0.082 | 0.437 | 0.590 | 0.273 |

TABLE 4-(d)

| δ | εmax | $r_4/r_3$ | $f_p/r_3$ | $f_T/f_{T'}$ | $f_p/f_v$ |
|---|---|---|---|---|---|
| −0.82 | 35.61 | 0.0 | 0.0 | 3.7 | 4.7 |

TABLE 5-(a)

| $r_1$ | −140.957 | $r_1'$ | −140.957 | $d_1$ | 2.38 | $n_1$ | 1.78292 |
|---|---|---|---|---|---|---|---|
| $r_2$ | ∞ | $r_2'$ | ∞ | $d_2$ | 15.92 |  |  |
| $r_3$ | ∞ | $r_3'$ | −50.987 | $d_3$ | 7.32 | $n_2$ | 1.483 |
| $r_4$ | −34.880 | $r_4'$ | −9.218 |  |  |  |  |

TABLE 5-(b)

|  |  | f | $f_5$ | b.f. | $S_1$ | Sk' | Effective F No. |
|---|---|---|---|---|---|---|---|
| Flat deflection plane | $f_p$ | 100.0 | $f_T$ 72.22 | 112.33 | −∞ | 112.33 | 60.0 |
| Perpendicular cross section | $f_v$ | 21.93 | $f_{T'}$ 22.04 | 25.75 | −4.55 | 113.80 | 100.0 |

TABLE 5-(b)-continued

| | f | $f_5$ | b.f. | $S_1$ | Sk' | Effective F No. |
|---|---|---|---|---|---|---|
| section | | | | | | |

TABLE 5-(c)

| I | II | III | IV | V | 2III + IV |
|---|---|---|---|---|---|
| 24.956 | 0.895 | −0.192 | 0.430 | 0.579 | 0.046 |

TABLE 5-(d)

| δ | εmax | $r_4/r_3$ | $f_p/r_3$ | $f_T/f_T'$ | $f_p/f_v$ |
|---|---|---|---|---|---|
| −0.82 | 35.46 | 0.0 | 0.0 | 3.3 | 4.6 |

TABLE 6-(a)

| $r_1$ | −116.570 | $r_1'$ | −116.570 | $d_1$ | 3.70 | $n_1$ | 1.77944 |
| $r_2$ | ∞ | $r_2'$ | ∞ | $d_2$ | 13.20 | | |
| $r_3$ | ∞ | $r_3'$ | −49.871 | $d_3$ | 5.31 | $n_2$ | 1.59 |
| $r_4$ | −39.762 | $r_4'$ | −10.274 | | | | |

TABLE 6-(b)

| | | f | $f_5$ | b.f. | $S_1$ | Sk' | Effective F No. |
|---|---|---|---|---|---|---|---|
| Flat deflection plane | $f_p$ | 100.0 | $f_T$ 67.39 | 112.46 | −∞ | 112.46 | 60.0 |
| Perpendicular cross section | $f_v$ | 21.12 | $f_T'$ 20.89 | 24.67 | −6.71 | 112.35 | 100.0 |

TABLE 6-(c)

| I | II | III | IV | V | 2III + IV |
|---|---|---|---|---|---|
| 20.676 | 0.165 | −0.208 | 0.350 | 0.588 | −0.066 |

TABLE 6-(d)

| δ | εmax | $r_4/r_3$ | $f_p/r_3$ | $f_T/f_T'$ | $f_p/f_v$ |
|---|---|---|---|---|---|
| −0.84 | 36.52 | 0.0 | 0.0 | 3.2 | 4.7 |

TABLE 7-(a)

| $r_1$ | −96.074 | $r_1'$ | −96.074 | $d_1$ | 4.99 | $n_1$ | 1.62 |
| $r_2$ | ∞ | $r_2'$ | ∞ | $d_2$ | 12.46 | | |
| $r_3$ | ∞ | $r_3'$ | −44.132 | $d_3$ | 5.67 | $n_2$ | 1.67429 |
| $r_4$ | −45.987 | $r_4'$ | −11.174 | | | | |

TABLE 7-(b)

| | | f | $f_5$ | b.f. | $S_1$ | Sk' | Effective F No. |
|---|---|---|---|---|---|---|---|
| Flat deflection plane | $f_p$ | 100.0 | $f_T$ 68.20 | 112.21 | −∞ | 112.21 | 60.0 |
| Perpendicular cross section | $f_v$ | 20.88 | $f_T'$ 20.75 | 24.62 | −5.93 | 112.67 | 100.0 |

TABLE 7-(c)

| I | II | III | IV | V | 2III + IV |
|---|---|---|---|---|---|
| 16.091 | −0.235 | −0.147 | 0.330 | 0.612 | 0.036 |

TABLE 7-(d)

| δ | εmax | $r_4/r_3$ | $f_p/r_3$ | $f_T/f_T'$ | $f_p/f_v$ |
|---|---|---|---|---|---|
| −0.84 | 36.37 | 0.0 | 0.0 | 3.3 | 4.8 |

TABLE 8-(a)

| $r_1$ | −107.628 | $r_1'$ | −107.628 | $d_1$ | 3.03 | $n_1$ | 1.79 |
| $r_2$ | 4054.369 | $r_2'$ | 4054.369 | $d_2$ | 13.89 | | |
| $r_3$ | 1273.393 | $r_3'$ | −40.447 | $d_3$ | 6.53 | $n_2$ | 1.49237 |
| $r_4$ | −33.052 | $r_4'$ | −8.383 | | | | |

TABLE 8-(b)

| | | f | $f_5$ | b.f. | $S_1$ | Sk' | Effective F No. |
|---|---|---|---|---|---|---|---|
| Flat deflection plane | $f_p$ | 100.0 | $f_T$ 65.54 | 114.83 | −∞ | 114.83 | 60.0 |
| Perpendicular cross section | $f_v$ | 20.04 | $f_T'$ 20.13 | 24.24 | −3.72 | 116.60 | 100.0 |

TABLE 8-(c)

| I | II | III | IV | V | 2III + IV |
|---|---|---|---|---|---|
| 30.143 | 0.697 | −0.240 | 0.363 | 0.594 | −0.117 |

TABLE 8-(d)

| δ | εmax | $r_4/r_3$ | $f_p/r_3$ | $f_T/f_T'$ | $f_p/f_v$ |
|---|---|---|---|---|---|
| −0.85 | 36.385 | −0.026 | 0.079 | 3.3 | 5.0 |

Figure 4:
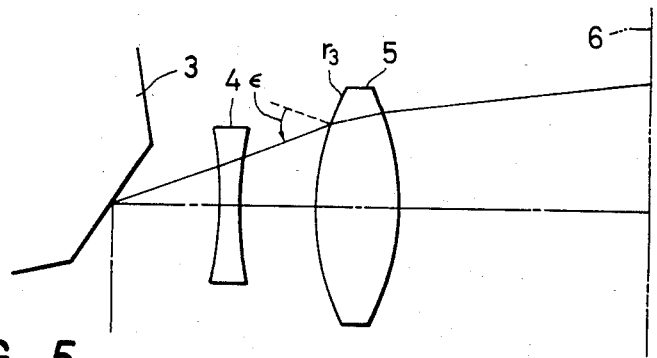
FIG. 4 illustrates an angle $\epsilon$ at which the principal ray deflected in the plane parallel to the deflection plane is incident on a lens having a toric surface.

As shown in FIG. 4, the angle which the normal (indicated by broken line) to the $r_3$ surface at the point of intersection between the deflected principal ray in the plane parallel to the deflection plane and the $r_3$ surface of the single lens 5 having the toric surface forms with the principal ray is expressed as ε (unit: degree; the counter-clockwise direction is the positive direction), and the ε corresponding to the maximum image height ($=0.6 \cdot f_p$) is expressed as ε max. The relation between ε and the image height in the embodiments shown in Tables 1(a)–(d) is shown in FIG. 5.

Figure 5:
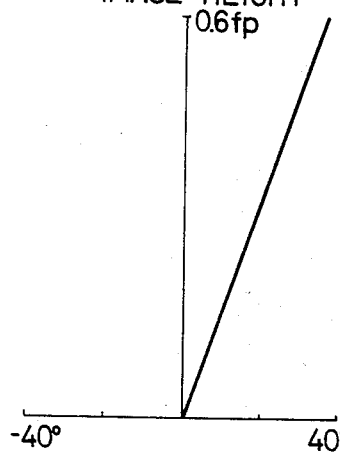
FIG. 5 illustrates the relation between the image height and the angle $\epsilon$ in a scanning lens system used with the present invention.

As seen in FIG. 5, in the embodiment shown in Table 1, ε increases as the image height increases. That is, as the incidence angle of view increases, the $r_3'$ surface of the lens 5 having the toric surface, as compared with the case of the on-axis light ray, has a strong power for the light beam including the principal ray and in the cross section perpendicular to the deflection plane, and by the effect combined with that of the $r_3$ surface of the lens 5 having the toric surface, this is convenient for the correction of the curvature of image field for causing the deflected light beam in said cross section to form a good imaged spot on the medium 6 to be scanned, and the entire optical system subsequent to the deflection plane has a strain characteristic which effects uniform speed scanning on the surface to be scanned, in the plane parallel to the deflection plane, and also has the effect of tilting correction in the cross section perpendicular to the deflection plane.

Figure 6A:
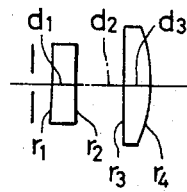
FIGS. 6A and 6B are cross-sectional views showing the shapes of an embodiment of the scanning lens applied to the present invention, in the plane parallel to the deflection plane and in the cross section perpendicular to the deflection plane, respectively.
Figure 6B:
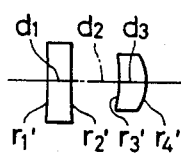
Figure 7A:
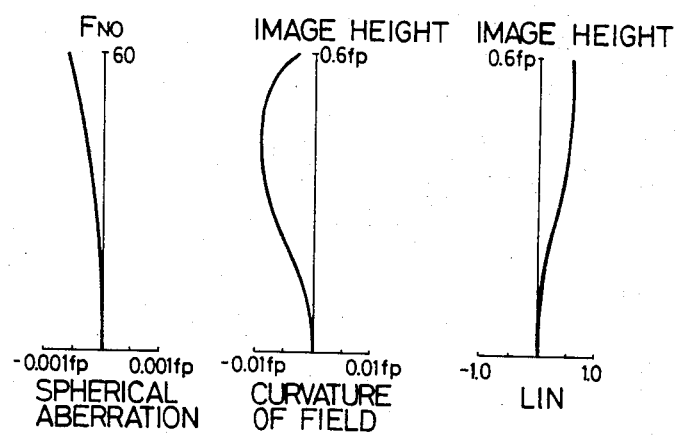
FIGS. 7A and 7B show the aberrations in the Gauss image plane of the lens shown in FIGS. 6A and 6B.
Figure 7B:
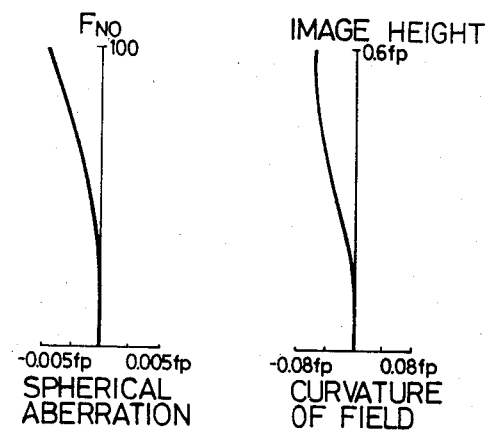

FIG. 6A shows the lens configuration of the Table 1 embodiment in the plane parallel to the deflection plane, and FIG. 6B shows the lens configuration of said embodiment in the cross section perpendicular to the deflection plane. FIG. 7A shows the aberrations in said embodiment in the plane parallel to the deflection plane, and FIG. 7B shows the aberrations in said embodiment in the cross section perpendicular to the deflection plane. In FIG. 7A, LIN is a quantity representing linearity, which is expressed as $$\text{linearity} = \frac{y' - f_p \cdot \theta}{f_p \cdot \theta} \times 100 \text{ } (y'\text{: image height})$$

In the aberration graphs of FIGS. 7A and 7B, as shown in the column Sk' of those of the tables which are given a suffix (b), the distance from the last surface (the $r_4$ surface or the $r_4'$ surface) of the single lens 5 having the toric surface to the Gauss image plane differs in the respective planes.

The embodiments of the present invention shown in Tables 1-8 satisfy, for example, the design specification shown by the following parameters. That is, if the beam is imaged in a condition in which the cross-sectional intensity distribution of the beam is a Gauss distribution and there is no truncation and the wavelength used is set to 800 nm and the effective F No. in the cross section parallel to the deflection plane is set to 60, then the allowable value $\Delta x$ of the depth of focus is $\Delta x = 3.7$ mm.

Accordingly, if the focal length $f_p$ of the composite system comprising the spherical single lens 4 and the single lens 5 having the toric surface in the cross section parallel to the deflection plane is set to $f_p = 100$ mm, it will be seen from formula (3) that $|2 \text{ III} + \text{IV}| \leq 0.56$ may be established in order that the meridional curvature of image field $\Delta M$ may satisfy $|\Delta M| \leq 3.7$ mm.

In view of the embodiments of the present invention shown in Tables 1-8, if the relation between the radius of curvature $r_3$ of the deflector side surface of the single lens 5 having the toric surface and the radius of curvature $r_4$ of that surface of the single lens which is adjacent to the medium to be scanned is $(1/r_3) < (1/r_4)$ in the plane parallel to the deflection plane, and if the relation between the focal length $f_p$ of the composite system comprising the spherical single lens 4 and the single lens 5 having the toric surface in the plane parallel to the deflection plane and the focal length $f_v$ of said composite system in the cross section perpendicular to the deflection plane is $4.0 < (f_p/f_v) < 5.4$, then the scanning optical system of the present invention has such a strain characteristic that uniform speed scanning is effected on the medium 6 to be scanned, in the plane parallel to the deflection plane, and has a tilting correcting effect in the cross section perpendicular to the deflection plane.

In the foregoing description, it is to be understood tha the sign of a radius of curvature is positive when that surface is convex toward the deflector side and is negative in the reverse case.

Figure 8:
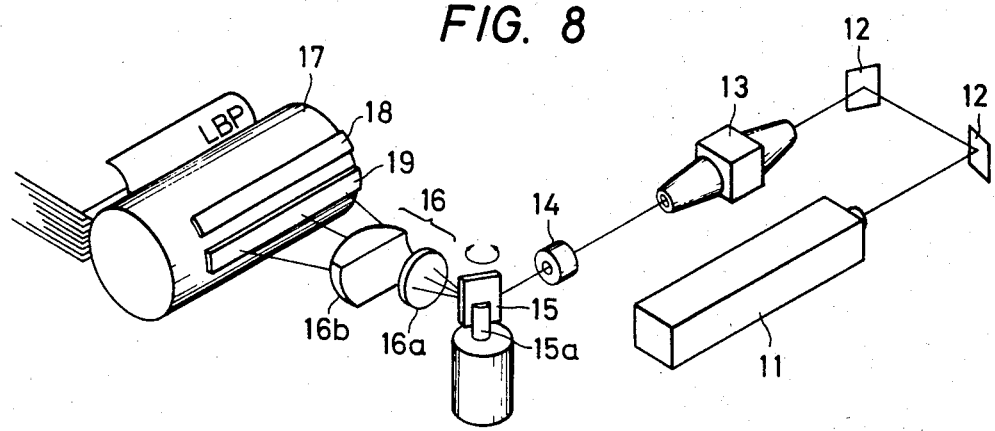
FIG. 8 is a schematic illustration of an embodiment of a laser beam printer to which the present invention is applied.

FIG. 8 shows an embodiment of the scanning optical system according to the present invention as applied to a laser beam printer. In FIG. 8, the laser beam oscillated from a laser oscillator 11 is directed via reflecting mirrors 12 to the entrance opening of a modulator 13. In the modulator 13, the laser beam is modulated by an information signal to be recorded, whereafter it is caused to form a linear image orthogonal to the rotary shaft 15a of a deflector 15 near the deflecting and reflecting surface of the deflector by a linear image forming system 14 comprising, for example, a cylindrical lens. The beam deflected by the deflector 15 is imaged on a photosensitive drum 17 by an imaging lens system 16 comprising the above-described spherical single lens 16a and toric single lens 16b, and scans the photosensitive drum 17 at a uniform speed. Reference numeral 18 designates a first corona charger and reference numeral 19 denotes an AC corona discharger. Both of them form a part of the apparatus for performing the electrophotographic process.

The laser oscillator 11 may be a light source device comprising a self-modulatable semiconductor laser and a beam reforming optical system for correcting the shape of the beam cross section of the laser light from the semiconductor laser and making the laser beam into an afocal light.

In the above-described application, the light beam entering the spherical single lens 16a in the plane parallel to the deflection plane need not always be a parallel beam but may be either divergent beam or a convergent beam, and the purpose of causing the light beam to be imaged near the reflecting surface of the deflector 15 in the cross section perpendicular to the deflection plane can be easily achieved by the light source device 11 comprising a light source and a condensing device and the linear image forming device 14.

Also, in the above-described application, where a light source such as a semiconductor laser in which the angle of light emission differs in two orthogonal planes is used as the light source device 11, if a rotationally symmetric optical system is used as the linear image forming system 14 by the utilization of the fact that the light-emitting point differs in said two orthogonal planes (since this is equivalent to the fact that the object point has an astigmatic difference in said two orthogonal planes), it will also be possible to cause the light beam to be imaged near the reflecting surface of the deflector 15 in the cross section perpendicular to the deflection plane and to cause a divergent light or a convergent light to enter the spherical single lens 16a in the plane parallel to the deflection plane.

What we claim is:

1. A scanning optical system for scanning a medium and having a tilting correcting function, comprising:
   means for supplying a light beam;
   means having a deflecting and reflecting surface for deflecting the light beam from said light beam supplying means in a predetermined direction;
   first optical means disposed between said light beam supplying means and said deflecting means for linearly forming the light beam from said light beam supplying means near said deflecting and reflecting surface of said deflecting means; and
   second optical means disposed between said deflecting means and a medium to be scanned for imaging on said medium the light beam deflected by said deflecting means, said second optical means comprising, in succession from said deflector, a single spherical lens and a single lens having a toric surface, the product of the curvature of the surface of said single spherical lens which is adjacent to said deflecting means and the curvature of the surface of said single spherical lens on the side of said medium being zero or less.

2. A scanning optical system according to claim 1, wherein said single spherical lens is double concave.

3. A scanning optical system according to claim 1, wherein said single spherical lens is plano-concave.

4. A scanning optical system according to claim 1, wherein at least one surface of said single lens having a toric surface is a surface having a negative refractive power in a plane containing the optical axis and perpendicular to the deflection plane.

5. A scanning optical system according to claim 1, wherein in a plane parallel to the deflection plane, the value of the curvature of the deflector side surface of said single lens having a toric surface is approximately zero.

6. A scanning optical system according to claim 1, wherein the focal length $f_T$ of said single lens having a toric surface in a plane parallel to the deflection plane and the focal length $f_T'$ of said single lens having a toric surface in a plane perpendicular to the deflection plane are in the relation that $(f_T/f_T') \leq 5.0$.

7. A scanning optical system according to claim 1, wherein in a plane containing the optical axis and perpendicular to the deflection plane, the shape of said single lens having a toric surface is a meniscus shape having its convex surface facing the medium to be scanned.

8. A scanning optical system for scanning a medium and having a tilting correcting function, comprising:

a light source portion for supplying a scanning light beam;

a deflector having a deflecting and reflecting surface for deflecting the light beam from said light source portion in a predetermined direction;

a first anamorphic optical system disposed between said light source portion and said deflector for linearly forming the light beam from said light source portion near the deflecting and reflecting surface of said deflector; and a second anamorphic optical system disposed between said deflector and a medium to be scanned for imaging the light beam from said deflector on said medium, said second anamorphic optical system comprising, in succession from said deflector side, a single spherical lens and a single lens having a toric surface, the product of the curvatures of the two surfaces of said single spherical lens being zero or less, the radius of curvature $r_3$ of the surface of said toric single lens which is on the side of said deflector and the radius of curvature $r_4$ of the surface of said toric single lens which is adjacent to said medium satisfying $$(1/r_3) > (1/r_4)$$

in a plane parallel to the deflection plane, the focal length $f_p$ of said second anamorphic optical system in a plane parallel to the deflection plane and the focal length $f_v$ of said second anamorphic optical system in a plane perpendicular to the deflection plane satisfying the relation that $$4.0 < (f_p/f_v) < 5.4.$$

* * * * *

UNITED STATES PATENT AND TRADEMARK OFFICE
CERTIFICATE OF CORRECTION

PATENT NO. : 4,447,112
DATED : May 8, 1984
INVENTOR(S) : KAZUHIKO MATSUOKA, ET AL.

It is certified that error appears in the above-identified patent and that said Letters Patent is hereby corrected as shown below:

IN THE ABSTRACT line 5, change "generated" to --generator--.

Col. 9, line 26 (Table 2-(a), line 2), change "117.94" to

--17.94--.

Col. 13, line 44, change " < " to -- > --;

line 57, change "tha" to --that--.

Signed and Sealed this

Twenty-third Day of October 1984

[SEAL]

Attest:

GERALD J. MOSSINGHOFF

*Attesting Officer*     *Commissioner of Patents and Trademarks*